(12) United States Patent
Bolasna et al.

(10) Patent No.: US 6,674,611 B2
(45) Date of Patent: Jan. 6, 2004

(54) AIR BEARING DESIGN PRODUCING STEEPER RAMP PROFILE NEAR THE LASER TEXTURE ZONE

(75) Inventors: Sanford A. Bolasna, San Jose, CA (US); Soo-Choon Kang, San Jose, CA (US)

(73) Assignee: Hitachi Global Storage Technologies, The Netherlands B.V., Amsterdam (NL)

(*) Notice: Subject to any disclaimer, the term of this patent is extended or adjusted under 35 U.S.C. 154(b) by 0 days.

(21) Appl. No.: 10/040,557

(22) Filed: Jan. 4, 2002

(65) Prior Publication Data

US 2003/0128471 A1 Jul. 10, 2003

(51) Int. Cl.[7] .................................................. G11B 5/60
(52) U.S. Cl. ................................ 360/236.2; 360/235.6; 360/236.3
(58) Field of Search ......................... 360/236.2, 236.3, 360/236.9, 237, 235.6, 235.7, 236.4

(56) References Cited

U.S. PATENT DOCUMENTS

| 3,823,416 | A | | 7/1974 | Warner |
| 4,894,740 | A | | 1/1990 | Chhabra et al. |
| 5,418,667 | A | | 5/1995 | Best et al. |
| 5,420,735 | A | | 5/1995 | Haines |
| 5,508,077 | A | | 4/1996 | Chen et al. |
| 5,729,399 | A | | 3/1998 | Albrecht et al. |
| 5,761,004 | A | * | 6/1998 | Peck ........................ 360/236.2 |
| 5,870,250 | A | | 2/1999 | Bolasna et al. |
| 6,115,329 | A | | 9/2000 | Hu |
| 6,117,499 | A | | 9/2000 | Wong et al. |
| 6,128,162 | A | * | 10/2000 | Kameyama ............... 360/236.2 |
| 6,490,135 | B1 | * | 12/2002 | Sannino et al. .......... 360/236.3 |

FOREIGN PATENT DOCUMENTS

WO   WO 95/06942   3/1995

\* cited by examiner

Primary Examiner—Robert S. Tupper
(74) Attorney, Agent, or Firm—Liu & Liu

(57) ABSTRACT

A dual etch depth slider air bearing surface includes a front pad disposed along the front and partially along the sides of the slider and a rear pad partially disposed along the rear of the slider, wherein a skewed center rail connects the front pad to the rear pad. Extending above the rear pad is a V-shaped ABS pad and extending above the front pad are two leading edge ABS pads that are separated by a channel towards the longitudinal center of the slider. The design enables the slider to fly much higher over the landing zone of the disk than at the data zone and provides for a steep take off profile followed by a rapid descend over the data zone.

18 Claims, 7 Drawing Sheets

AIR BEARING DESIGN PRODUCING STEEPER RAMP PROFILE NEAR THE LASER TEXTURE ZONE

BACKGROUND OF THE INVENTION

1. Field of the Invention

This invention relates in general to magnetic recording disk drives, and more particularly to the configuration of the air bearing surface of a slider for use in a contact start/stop magnetic disk drive.

2. Description of Related Art

Disk drives are storage devices that use a rotatable disk with concentric data tracks containing information, a head or transducer for reading and/or writing data onto various tracks, and an actuator connected to a carrier for the head moving the head to the desired track and maintaining it over the track centerline during read or write operations. There are typically a plurality of disks separated by spacer rings and stacked on a hub that is rotated by a disk drive motor. A housing supports the drive motor and head actuator and surrounds the head and disk to provide a substantially sealed environment for the head-disk interface.

In typical magnetic recording disk drives, the head carrier is an air bearing slider that rides on a bearing of air above the disk surface when the disk is rotating at its operational speed. The slider is maintained next to the disk surface by a relatively fragile suspension that connects the slider to the actuator. The slider is either biased toward the disk surface by a small spring force from the suspension, or is self-loaded to the disk surface by means of a negative pressure air bearing surface on the slider.

For contact start/stop (CSS) disk drives, the air bearing slider is in contact with the disk surface during start and stop operations when there is insufficient disk rotational speed to maintain the air bearing. To reduce wear between the disk and slider, a thin lubricant layer is placed over the surface of the disk. When a drive is turned off, the slider is typically brought to the inner radius of the disk to land on the disk surface. A dedicated textured landing area (or landing zone) is designated, typically at the inner radius of the disk surface, for the purpose of providing a landing surface for the slider and to minimize stiction.

Stiction results when the air bearing surface (ABS) of the slider has been in stationary contact with the disk for a period of time and tends to resist translational movement or "sticks" to the disk surface. Stiction is caused by a variety of factors, including static friction and adhesion forces between the disk and slider created by the thin film of lubricant. Stiction in a disk drive can result in damage to the head or disk when the slider suddenly breaks free from the disk surface when disk rotation is initiated. In addition, because the suspension between the actuator and the slider is relatively fragile to permit the slider to fly above the disk surface, sudden rotation of the disk can also damage the suspension. As the landing zone bump height is decreased (i.e., a shallower bump height) to reduce data zone fly height, stiction is more likely to happen, which can be one of the main reasons for drive failure. Stiction can be strong enough to disable the disk spindle motor operation.

The main problem with the imparting texture to the landing zone area of the disk is that it makes the disk surface rougher and hence brings the disk surface that much closer to a flying head. As the margin between the flying height and the top most region of the texture area is reduced, thereby increasing the potential for head disk contact and hence the possibility of a head crash. Assignee's U.S. Pat. No. 5,870,250 disclosed the use of a slider design having a single etch depth design to produce a ramp fly height profile in which the slider typically flies higher over a textured landing zone than over a data zone of the disk. The slider includes left and right rails disposed along the sides of the slider and a center crossbar connecting the rails. Extending from the center crossbar is a center rail that broadens as it reaches the trailing edge of the slider. The described slider configuration enables it to have a ramp fly height profile. However, the fly height achieved by the slider design along with other operating factors such as fly height sensitivity, altitude loss, and seek loss are not suitable for operation in disk products that require a low fly height (e.g. less that 0.50 microinches).

As the pressure to increase recording density forces lower flying heights, the balance between the need for a landing zone having a suitable bump height and the need to fly lower on the data zone is a difficult challenge. To reduce stiction, the height of the texture or bumps must be increased, but yet the fly height over the data zone is always decreasing as a result of higher density. What is needed is an improved air bearing slider design that provides a rapid fly height acceleration for clearing the textured landing zone to improve slider durability, followed by a rapid descent toward the data zone and the ability to maintain a low fly height across the data zone of the disk.

SUMMARY OF THE INVENTION

The present invention overcomes the drawbacks of the prior art by configuring a dual etch depth slider air bearing surface having novel leading end ABS, trailing ABS pad and a skewed center rail configuration, which help the slider achieve a steeper ramp fly height profile near the textured landing zone of the disk and a rapid descent toward the data zone. The air bearing slider includes a slider body on which a front pad extends from the leading edge section of the slider body to an asymmetric rear pad at the trailing edge of the slider body via a skewed center rail. The front pad supports a U-shaped leading ABS pad includes first and second sections separated by a channel. The leading ABS pad is defined near and along a leading edge (relative to a moving recording medium) and partially along the side of the slider body. An asymmetric V-shaped rear ABS pad is supported on the rear pad and defined about the longitudinal axis and proximate to a trailing edge of the slider body.

DETAILED DESCRIPTION OF THE PREFERRED EMBODIMENT

This invention is described in a preferred embodiment in the following description with references to the following figures. While this invention is described in terms of the best mode of achieving this invention's objectives, it will be appreciated by those skilled in the art that variation may be accomplished in view of these teachings without deviating from the spirit or scope of the invention.

Figure 1:
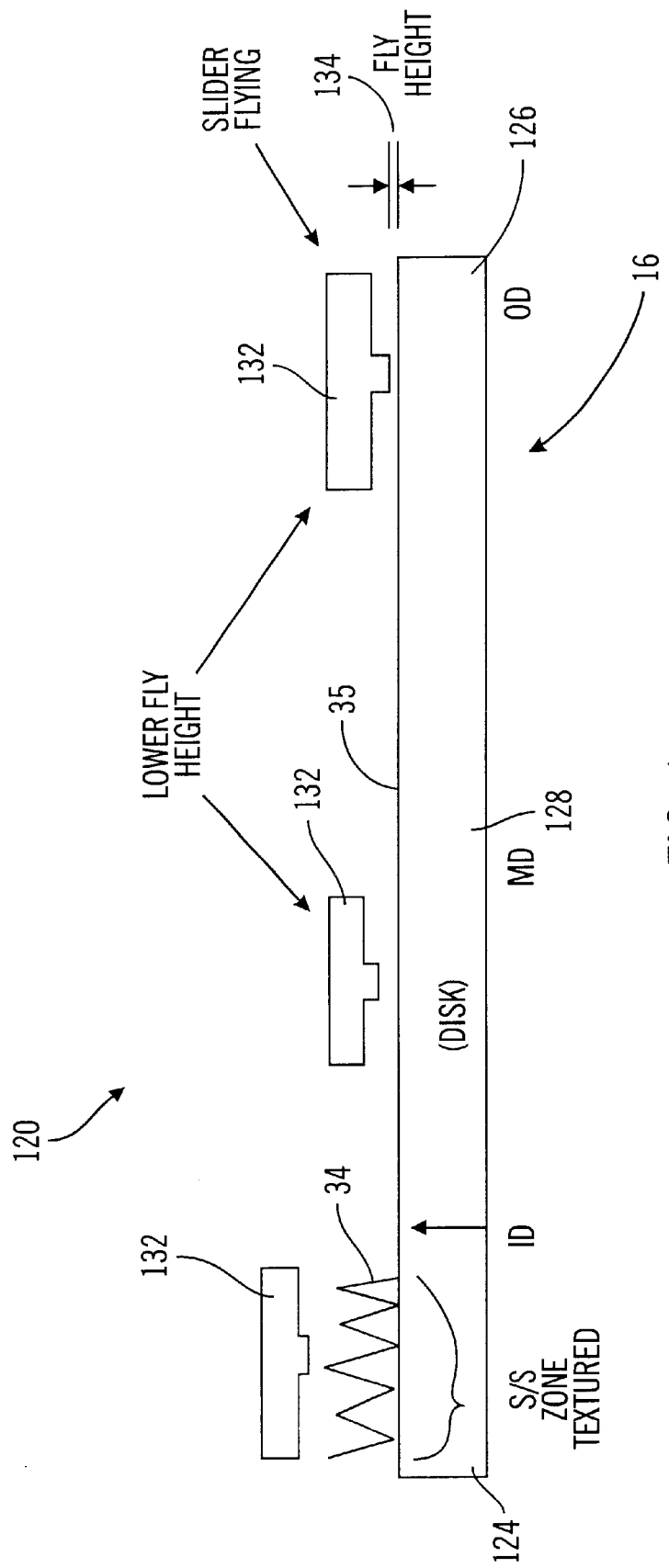
FIG. 1 illustrates a disk/slider combination in accordance with the present invention.

FIG. 1 illustrates a disk/slider combination 120 according to the present invention. The disk 16 has an inner diameter 124, middle diameter 128 and an outer diameter 126. The inner diameter 124 includes a textured start-stop landing zone 34 to decrease stiction. The remaining portion of the disk 16 (middle diameter 128 and outer diameter 126) is a relatively smooth magnetic recording surface 35. Those skilled in the art will recognize that the entire surface of the disk 16 may include a textured surface. However, those skilled in the art will recognize that the texture is much more coarse over the landing zone 34. Accordingly, the texture surface is not drawn to scale in FIG. 1, but rather illustrates the fly height profile of the disk/slider combination 120. The air bearing slider 132 exhibits a selected fly height over the landing zone 34 as illustrated in FIG. 1. However, as the air bearing slider 132 is positioned away from the landing zone 34 to a position over the magnetic recording surface 35, the air bearing slider 132 exhibits a lower fly height 134.

Figure 2:
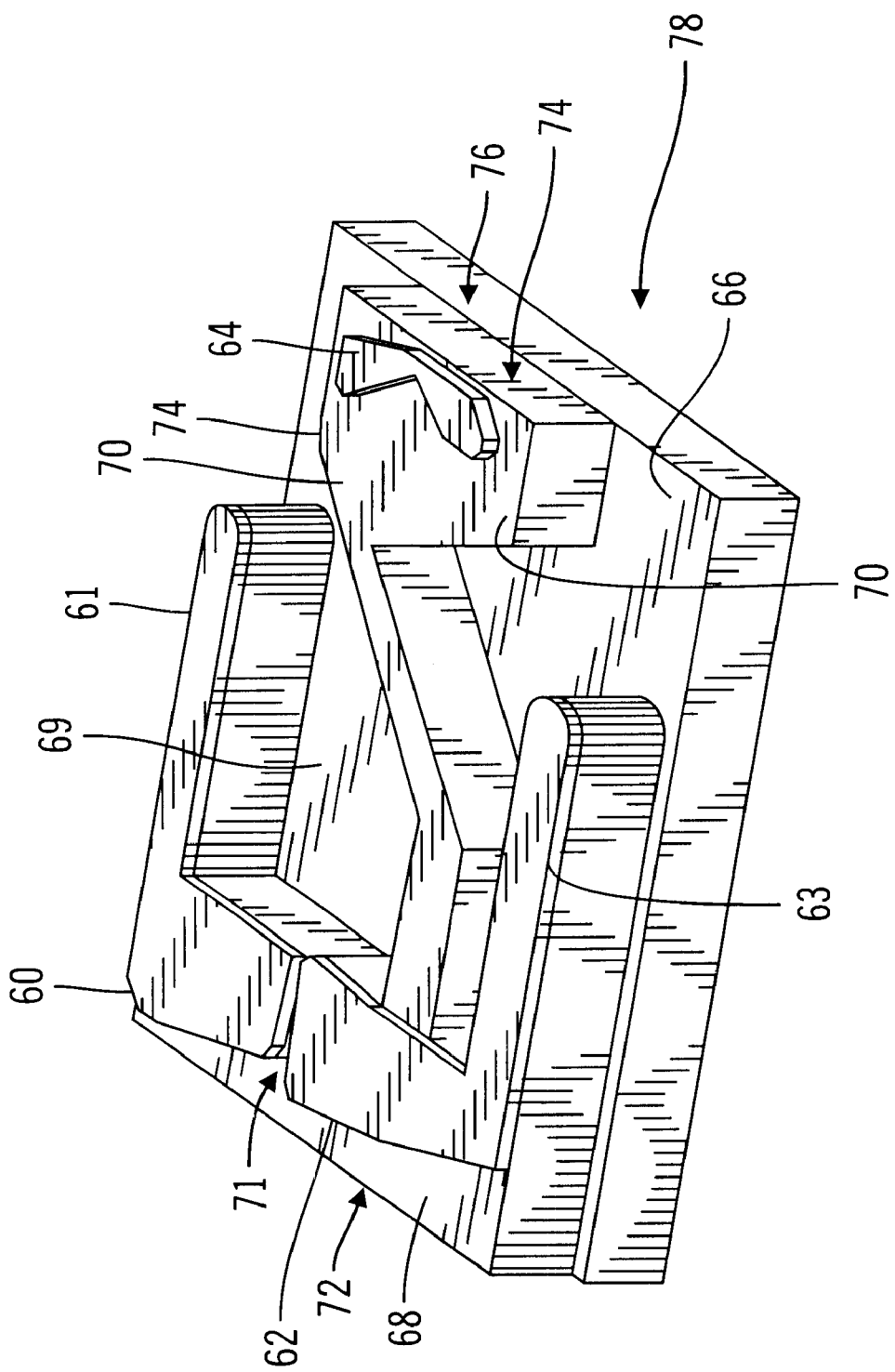
FIG. 2 is a perspective view of the air bearing slider in accordance with one embodiment of the present invention.
Figure 3:
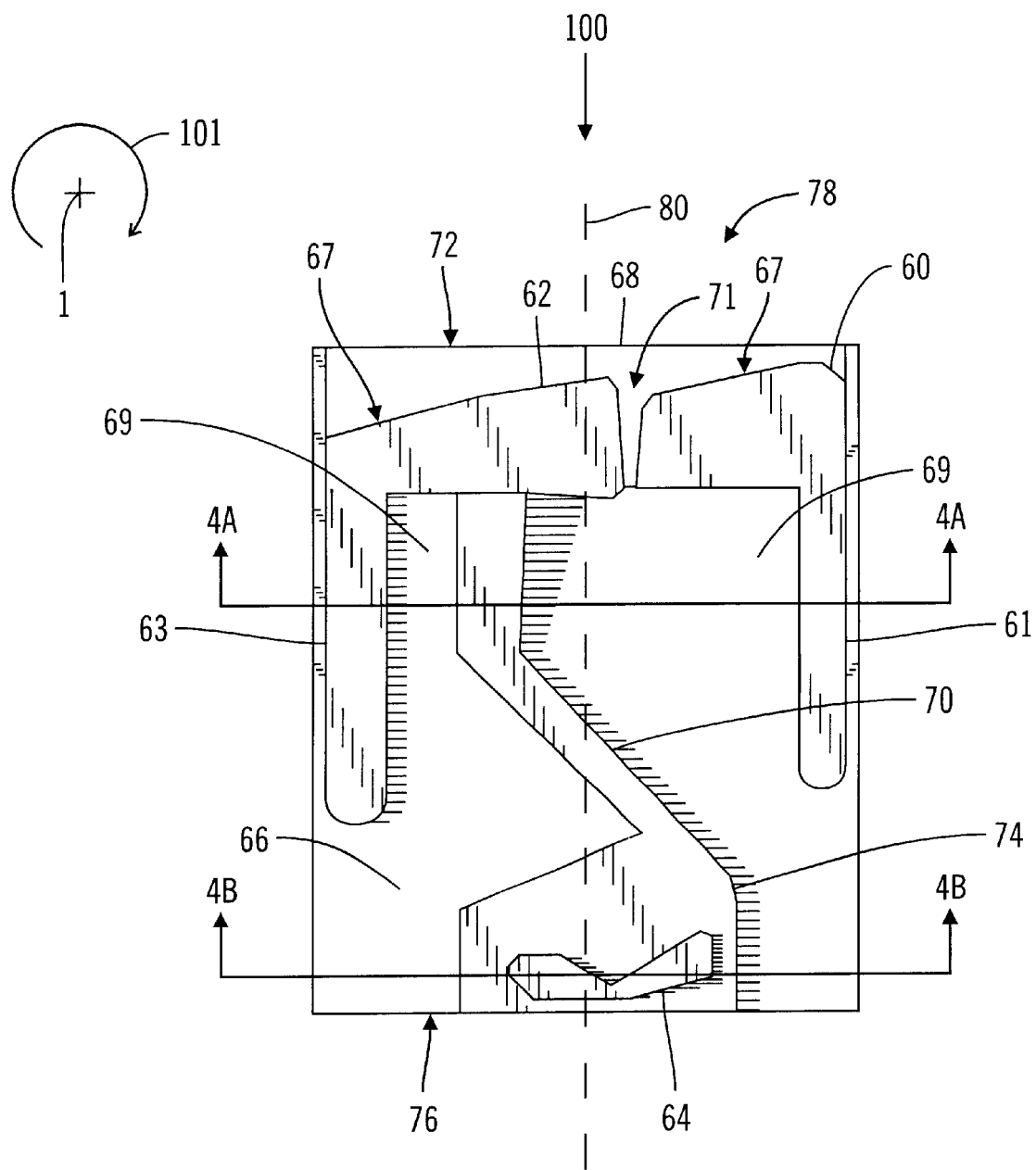
FIG. 3 is a top view of the air bearing surface of the slider of FIG. 2
Figure 4A:
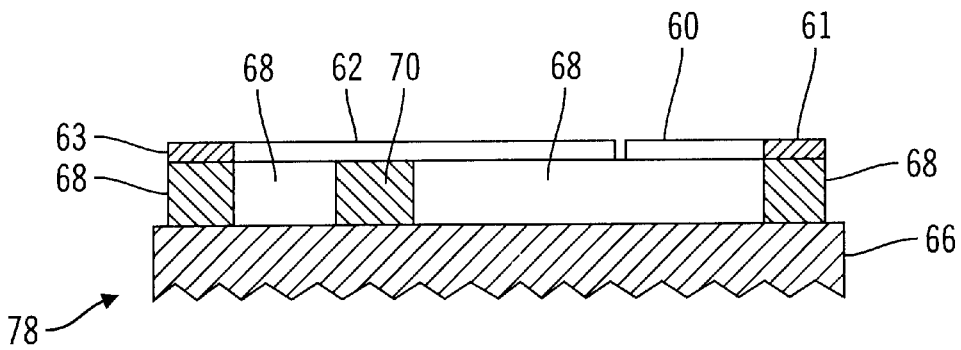
FIG. 4A is a sectional view of the air bearing slider taken along line 4A-4A in FIG. 3.
Figure 4B:
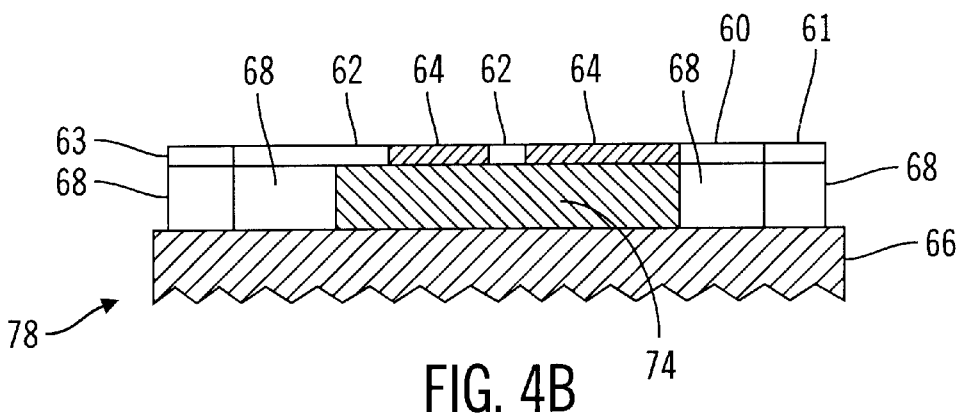
FIG. 4B is a sectional view of the air bearing slider taken along line 4B-4B in FIG. 3.

FIG. 2 shows in perspective the air bearing surface of the slider 78. Shown in FIG. 3 is the top view of the air bearing surface of the slider 78, and FIGS. 4A and 4B are sectional views of the slider 78 showing the dual depth structure of the air bearing surface. The slider 78 includes a body 66 having a leading edge 72 and a trailing edge 76 relative to the motion of the disk 16 (represented by arrow 100) in FIG. 3, and a longitudinal axis 80 along the length of the slider 78. The slider 78 further includes a front pad 68 defined on the slider body 66, and along the leading edge 72 and partially along the right and left side of the slider 78. The height of the front pad is on the order of 1.52 µm in the particular embodiment shown.

A right leading end ABS pad 60 and a left leading end ABS pad 62, separated by a channel 71 is defined on the front pad 68, extending from the rear (trailing edge) half of the front pad 68 and continues along each side as rails 61 and 63 above the pad 68. (Right and left are viewed in reference to the longitudinal axis 80 of the slider 78, when viewed from the trailing edge 76 in FIG. 3.) The ABS pads 60 and 62 are on the order of 0.18 µm in height above the pad 68 for the embodiment shown. It can be seen that the ABS pad 60 and the pad 68 together create a "cavity" 69 having a generally U-shaped wall, at the front center of the air bearing surface. The leading edge of the left leading edge ABS pad 62 is skewed at a defined angle 67 with respect to the base leading edge 72 at the corner of side rail 63. This angle 67 helps to improve the take-off velocity of the slider 78 at the landing zone 34 of the disk 16 and has minimal effect on the slider fly height towards the middle and outer diameter of the disk. In addition, the leading edge of the right leading edge ABS pad 60 may also be skewed at a different or the same defined angle 67 with respect to the leading edge 72 at the corner of side rail 61. The angle 67 is in the general direction of the landing zone 34. In FIG. 3, the center of the disk 16 is generally represented at 103 with the direction of rotation of the disk 16 represented by arrow 101. For the illustrated embodiment, the angle 67 is in the range of 10~20 degrees, preferably 15 degrees, which is consistent with the skew angle at the landing zone 34. The actual angle 67 is determined by maximizing the take off velocity of the slider 78 and meeting a targeted fly height profile across the disk surface. While not shown in the figures, the front section of pad 68 may slope down to body 66 and towards the edge 72 to improve lift of the leading edge 72 relative to the trailing edge 76 to achieve a positive pitch of the slider 78 during disk drive operations.

An asymmetric or skewed shaped rear pad 74 is defined on the body and partially along the trailing edge 76, and centered near the longitudinal axis 80. The rear pad 74 is generally rectangular shaped from the trailing edge 76 towards the center of the slider 78. In the embodiment shown in FIG. 3, the sides of the rear pad 74 near the trailing edge 76 are parallel before skewing towards the right of the slider at an angle of approximately 40~50 degrees, for the illustrated embodiment of a slider body having the general physical dimension on the order of 1.245 mm by 1 mm. The size of the rear pad 74 is on the order of 250 µm by 500 µm, and the height of the rear pad 74 is on the order of 1.52 µm.

A V-shaped trailing ABS pad 64 extends above the rear pad 74 at a location proximate the trailing edge 76 of the slider 78. The size of the trailing ABS pad 64 is on the order of 140 µm×400 µm and the height is 0.18 µm. As illustrated in FIG. 3, the trailing ABS pad 64 has an asymmetric profile with respect to the longitudinal axis 80 of the slider. The inside angle of the trailing ABS pad 64 is 120 degrees for the illustrated embodiment and the angle should not be less than 90 degrees to prevent debris from accumulating within the inside angle.

Integrated into the trailing edge side of the front pad 68 is a center rail 70 that is partially parallel with the longitudinal line 80 before skewing at a defined angle, towards the right side of the slider 78 and connected to a rear pad 74. The skew angle of the center rail 70 with respect to the longitudinal axis 80 is 40 degrees in this particular embodiment shown. The width of the center rail 70 is on the order of 100 to 160 µm and the height is 1.52 µm in the particular embodiment shown. The skewing of the center rail 70 helps to boost fly height at or near the landing zone 34 by providing a maximum surface area and minimum air flow resistance. The center rail 70 divides the negative pressure cavity formed by the front and side rails at the optimal position to obtain flat fly height profile at the data zone.

The size, location, and shape of the trailing ABS pad 64 are some of the parameters that affect the fly height profile and other functional requirements such as fly height sensitivity, altitude loss, and seek loss of the slider 78. To minimize the fly height sensitivity to process parameters, the size should be small but large enough to support air pressure to provide design fly height.

The construction of the slider may be processed by processes known in the art. For example, the rear pad 74, front rail 68, leading ABS pads 60 and 62, and trailing ABS pad 64 are created by a series of steps involving one or more of deposition and etching (e.g. ion milling) and the cavity 69 is produced through reactive ion etching (RIE).

The configuration of the air bearing slider 78 described above contains different pressure zones. The pressure zones are formed when the air bearing surface of the slider 78 is positioned adjacent to a magnetic recording surface 35 of magnetic disk 16 rotating to provide load forces on the head arm assembly 24 that are balanced in such a manner that the desired flying characteristics for the slider 78 can be achieved. In operation, negative pressure is developed in the cavity 69 formed by the front rail 68, leading end ABS pads 60, 62, and side ABS pads 61, 63. The side of the leading end ABS pad 60, 62 and the center rail 70 mainly function to control the area of the cavity 69. The cavity 69 removes any airlift in that region of the slider 78, thus minimizing the total airlift on slider 78. This negative pressure reduces the pitch of the slider 78. The leading end ABS pad 60, 62, side ABS pad 61, 63 and trailing ABS pad 64 provide positive pressure that is slightly greater than the negative pressure, which maintains the slider above the disk surface. The pressure components are combined so that the slider 78 flies at a desired pitch angle relative to the moving magnetic disk 16 with an altitude by which the trailing edge 76 of the slider 78, where a magnetic transducer is mounted, is closest to the disk surface 35 and assured to be spaced at a flying height distance from the magnetic recording medium surface 35.

By having the center rail 70 connected in between the front rail 68 and rear pad 74, the fly height sensitivity to the speed of the slider 78 over the disk landing zone 34 increases over a conventional air bearing slider. The increase in the fly height sensitivity allows for a steeper take off profile. In addition, the V-shaped design of the trailing ABS pad 64 improves the take off velocity (TOV) of the slider 78, while at the same time maintaining roll stiffness by increasing the area of the rear pad 74 step. The typical fly height over the disk landing zone of the slider 78 is between 6 to 7 nm, whereas, the typical fly height of a conventional air bearing slider is approximately 2 mn.

Figure 5:
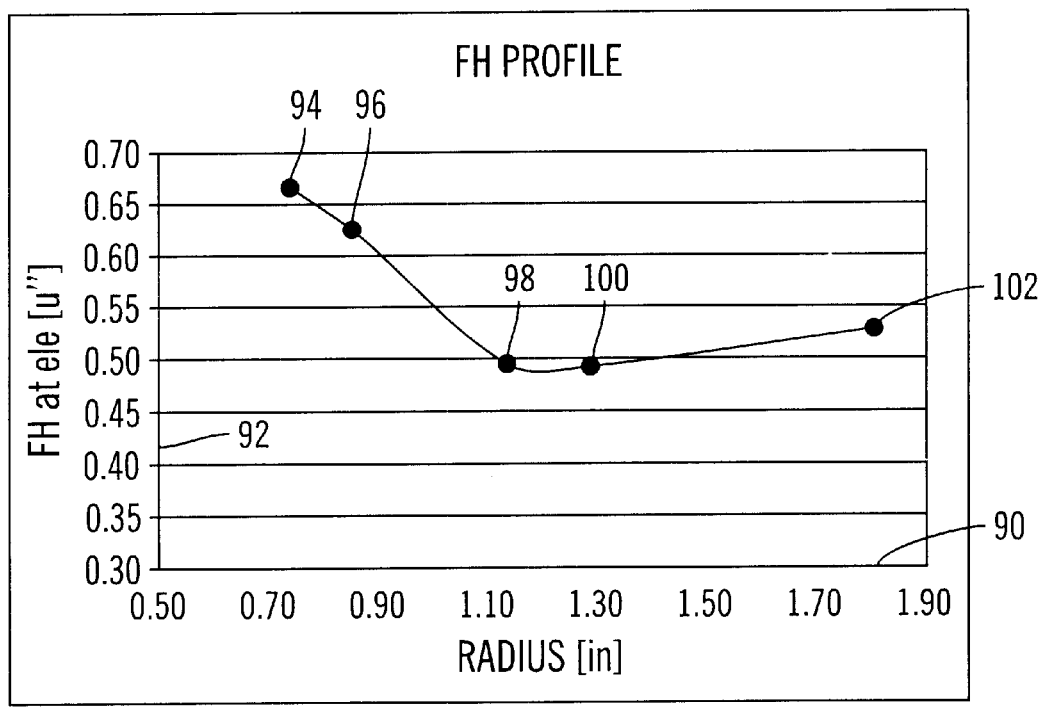
FIG. 5 is a graph illustrating the air bearing slider fly height as a function of radial distance from the center of a disk.

FIG. 5 is a graph illustrating a fly height profile of the air bearing slider illustrated in FIG. 2. The data used in this graph was obtained by using a proprietary modeling tool developed by IBM and the data was confirmed to be accurate through actual fly height measurements. The disk was operating at 7,200 RPM and a 2.5 gram load applied to the slider. The radial distance in inches, is shown along horizontal axis 90 and the fly height in microinches, is shown along the vertical axis 92. Five data points are plotted on the graph forming a curve, indicating the nominal fly height of the magnetic transducer over the disk surface. Nominal fly height is used because actual fly height of individual parts varies as a function of process parameters. The five data points represent the starting locations on the disk of the landing zone 94, inside diameter 96, first middle diameter 98, second middle diameter 100, and outside diameter 102. The data points were selected because they indicate the different transitions of the magnetic transducer across the surface of the disk. For example, the area between data points 94 and 96, is the landing zone of the disk and is in a radial range of 0.70 to 0.82 inch.

As can be seen from the graph, the fly height of the magnetic transducer is relatively high over the landing zone 94 of the disk and rapidly drops to a lower fly height as the slider reaches the data zone 96, 98, 100, and 102. The fly height over the landing zone 94 indicates that the slider is capable of maintaining enough of a distance above the landing zone 94 that a conventional bump height of greater than 13.0 nm can be used, such that stiction force can be reduced. The fly height slightly increases as the slider moves from the middle diameter 98 and 100 towards the outer diameter 102 as a result of different pressure generated by higher disk velocity at the outer diameter 102.

Figure 6:
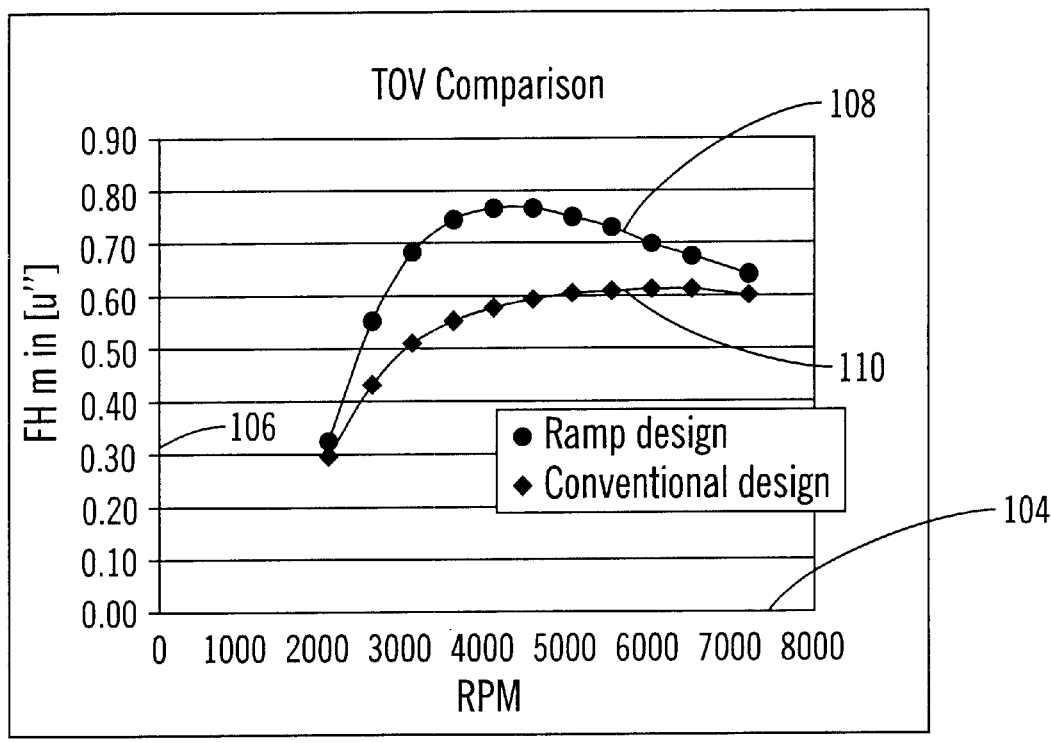
FIG. 6 is a graph illustrating the air bearing slider fly height as a function of a disk rotation speed.
Figure 9:
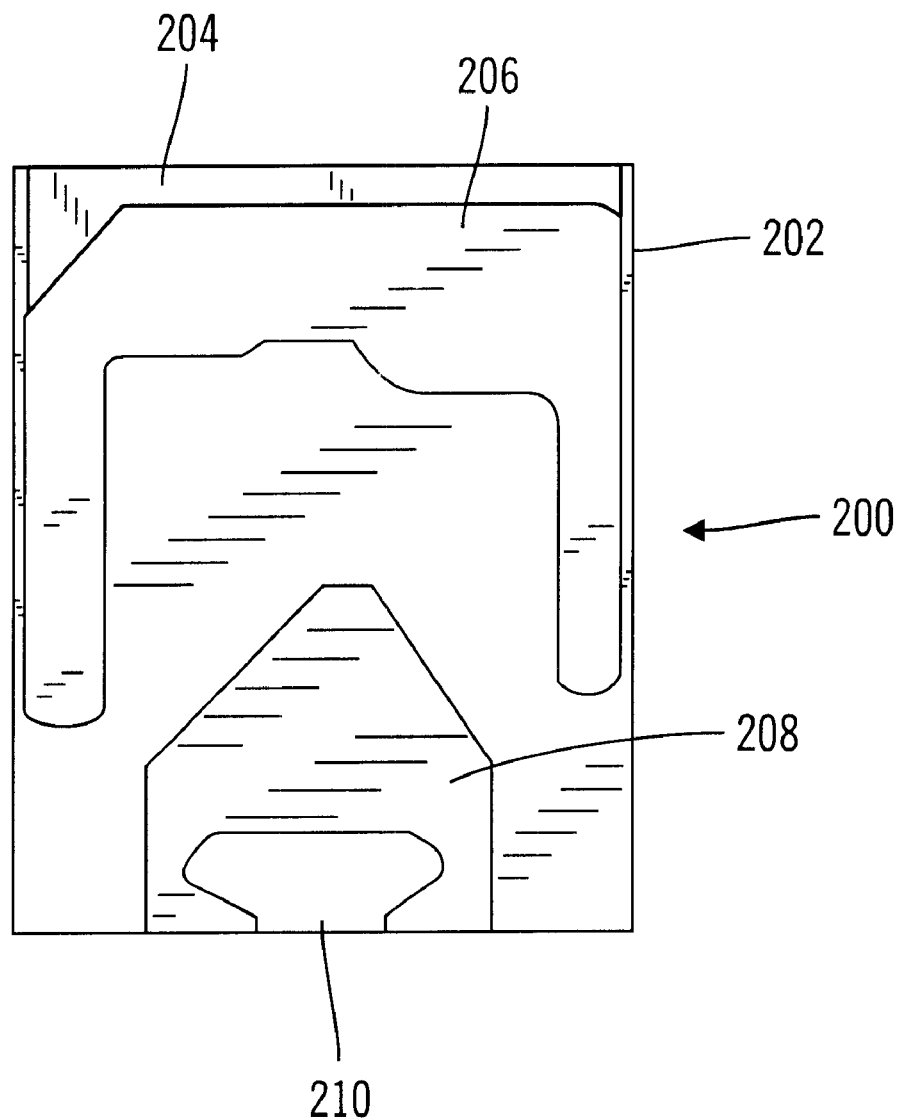
FIG. 9 is a bottom view of an air bearing slider in a copending patent application.

FIG. 6 is a graph illustrating the fly height of two air bearing sliders as a function of the rotational speed of a disk from 1,500 to 7,200 RPM. The data was obtained by modeling the air bearing slider illustrated in FIG. 2 with a 2.5 gram load. The disk rotational speed is shown along horizontal axis 104 and the fly height in micro inches is shown along the vertical axis 106. Curve 108 corresponds to the take off velocity of the slider of the present invention (shown in FIG. 2) and curve 110 corresponds to the take off velocity of the slider 200 shown in FIG. 9, which is the subject matter of copending patent application No. 09/838,701, filed Apr. 18, 2001, by the same inventor and which is commonly assigned to the assignee of the present invention (this application is fully incorporated by reference herein). The slider 200 comprises of a rectangular shaped base 202 having a front rail 204 extending across the leading edge of the slider and partially down each side. Extending from the front rail 204 is a continuous U-shaped ABS pad 206. A hexagonal shaped rear pad 208 is positioned at the trailing edge and extending from it is an ABS pad 210 that is in the shape of a skewed rectangle. Comparing the slider 78 of the present invention to slider 200, both sliders remained in the landing zone as the velocity of the disk increased from 1,500 to 7,200 RPM. Eleven different operating speeds between 1,500 to 7,200 RPM were selected and the fly height from the magnetic transducer to the disk surface was measured.

At an initial disk operating speed of 2,000 RPM, the fly height for both sliders are nearly identical, at approximately $0.30\mu$". As the disk RPM is increased, the fly height of the present slider design shows a steep increase in fly height compared with that of the slider 200. For example, as the disk rotates at 3,000 RPM the fly height of the present slider design is at approximately $0.70\mu$" compared with $0.50\mu$" for the slider 200. As can be seen from the graph, the present slider design shows a fast take off characteristic which allows it to clear the textured bumps on the landing zone at a lower take-off RPM. Additionally, at an operating disk speed of 7,200 RPM, the difference in fly height between the slider 200 and the present slider design is less than $0.05\mu$", which is relatively small.

Figure 7:
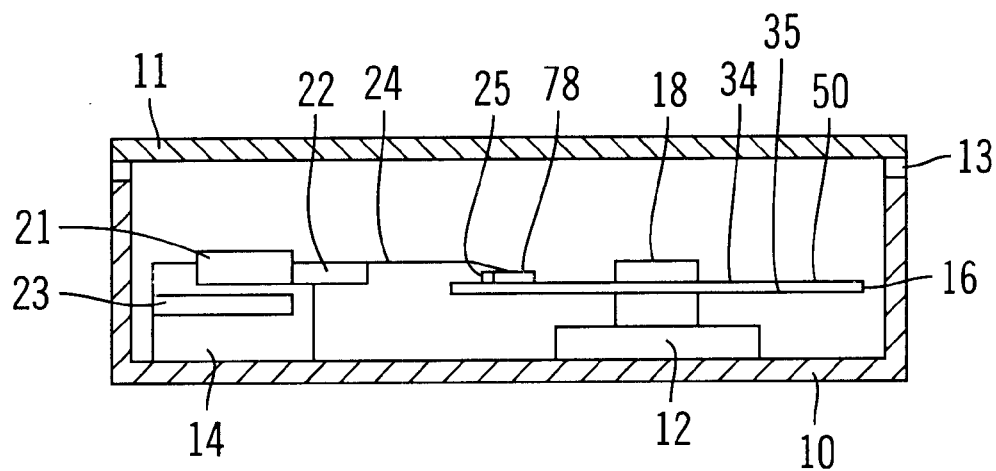
FIG. 7 is a schematic side view of a disk drive according to the present invention.
Figure 8:
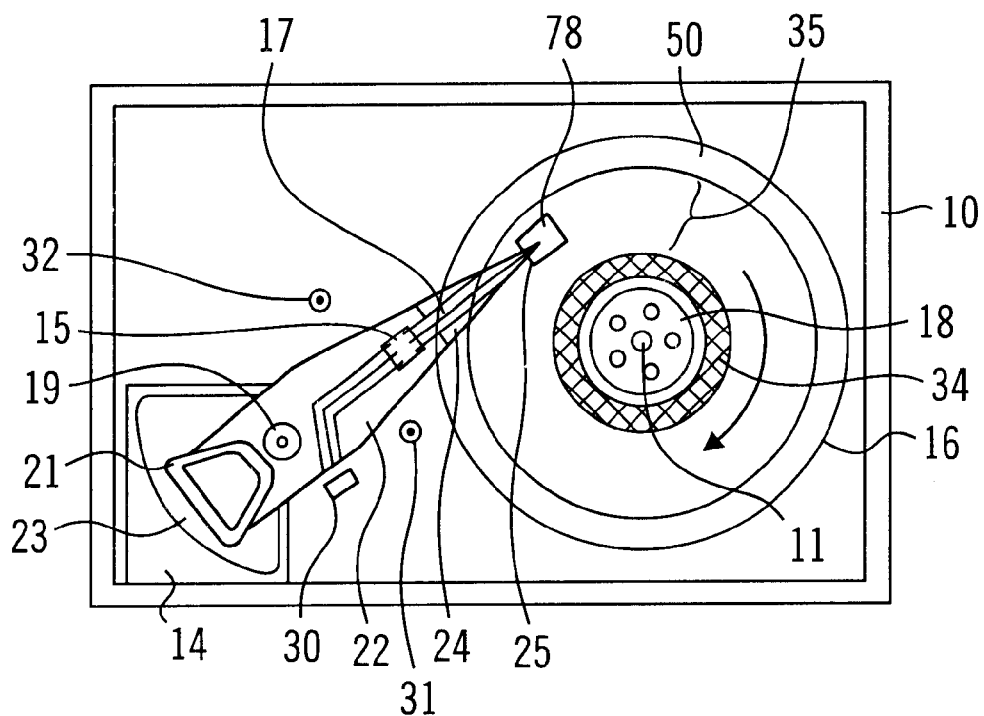
FIG. 8 is a top view of the disk drive of FIG. 7 with the cover removed and illustrating the textured landing zone.

Referring to FIGS. 7 and 8, there is illustrated a sectional schematic view and top view of a CSS disk drive according to the present invention. The general operation of a disk drive having a textured landing zone is described in Assignee's U.S. Pat. No. 5,729,399, entitled "Contact Start/Stop Disk Drive with Minimized Head-Disk Wear in Textured Landing Zone" which is fully incorporated herein by reference. The disk drive comprises a base 10 to which a spindle motor 12 and an actuator 14 are secured. The base 10 and cover 11 provide a substantially sealed housing for the disk drive. Typically, there is a gasket 13 located between base 10 and cover 11. A magnetic recording disk 16 is connected to spindle motor 12 by means of a spindle or hub 18. The disk 16 has a dedicated textured landing zone 34 near the disk inside diameter away from the disk data region 35. A thin film 50 of lubricant is maintained on the surface of disk 16. A read/write transducer or head 25 is formed on the trailing end of a head carrier, such as an air-bearing slider 78. Head 25 may be an inductive read and write transducer or an inductive write head with a magnetoresistive (MR) read head. The slider 78 is connected to the actuator 14 by means of a rigid arm 22 and a suspension 24, the suspension 24 providing a biasing force that urges the slider 78 onto the surface of the recording disk 16. The arm 22, suspension 24, and slider 78 with head 25 are referred to as the head-arm assembly 26. The actuator 14 is a balanced rotary voice coil motor (VCM) having a coil 21 that moves through the fixed magnetic field of magnet assembly 23 when current is applied to the coil 21. An inside diameter crash stop 31 and an outside diameter crash stop 32 are mounted to base 10 to limit the travel of rotary actuator 14. A latch 30 is also mounted to base 10 for engagement with the actuator or arm 22 to restrain movement of the actuator 14 when the disk drive is not operating.

When the disk drive is stopped the actuator 14 will be at its parking location, i.e., with the actuator 22 latched by latch 30 and with the air-bearing surface of slider 78 in contact with the textured surface of the disk landing zone 34 near the disk ID. During operation of the disk drive, the spindle motor 12 rotates the disk 16 and the actuator 14 is unlatched and pivots on shaft 19 to move the slider 78 generally radial across the surface of the disk tracks on disk 16. The precise data track accessing and centerline positioning is accomplished by control electronics that receives servo positioning information recorded on the disk and read by the head.

The data detected from the disk data region 35 by the head 25 is processed into a data readback signal by signal amplification and processing circuitry in the integrated circuit chip 15 located on arm 22. The signals from head 25 travel via flex cable 17 to chip 15 which sends its output signals via cable 19.

In summary the present invention provides a dual etch depth slider design comprising a skewed center channel connecting a U-shaped front rail to a skewed rectangular shaped rear pad. Extending from the front rail are two ABS pads, which are angled towards the landing zone skew angle, and extending from the rear half of the rear pad is a V-shaped trailing ABS pad. The dual etch process improves the air bearing stiffness of the slider, resulting in a smaller fly height deviation and less altitude loss. The combined design features of the slider provide for a steep ramp profile wherein the slider flies higher over the textured landing zone and rapidly descends to a low fly height over the data zone of the disk.

While the present invention has been described with respect to the preferred embodiments in accordance therewith, it will be apparent to those in the skilled art that various modifications and improvements made without departing from the scope and spirit of the invention. Accordingly, the disclosed invention is to be considered merely as illustrative and limited in scope only as specified in the appended claims.

We claim:

1. An air bearing slider for supporting a transducer over a rotating recording medium having a relatively smooth data zone and at least one textured zone, comprising: a support structure having a leading edge and a trailing edge relative to the motion of the recording medium, and a longitudinal axis along the length of the support structure; and an air bearing surface configured on the support structure to face the recording medium, said air bearing surface including: a front pad defined on the support structure near the leading edge, a leading ABS pad defined on the front pad, wherein the leading ABS pad covers less than area of the front pad, a rear pad defined on the support structure near the trailing edge, and a rail defined on the support structure interconnecting the front pad and the rear pad, wherein the rail is generally diagonal with respect to the longitudinal axis.

2. An air bearing slider as in claim 1, wherein the front pad and the leading ABS pad define a cavity in the air bearing surface in which the rail is exposed.

3. An air bearing slider as in claim 2, wherein the rear pad comprises an asymmetric trailing ABS pad.

4. An air bearing slider as in claim 2, wherein the leading ABS pad includes a first and second portions separated by a channel across the leading edge of the support structure.

5. An air bearing slider as in claim 4, wherein the first portion includes a first front rail and a first side rail, and the second portion includes a second front rail and a second side rail, and wherein the first front rail and the second front rail are separated by the channel.

6. An air bearing slider as in claim 5, wherein the first front rail has a first leading edge that is skewed at a first angle with respect to the leading edge of the support structure.

7. An air bearing slider as in claim 6, wherein the second front rail has a second leading edge that is skewed at a first angle with respect to the leading edge of the support structure.

8. An air bearing slider as in claim 6, wherein the first angle is 15 degrees.

9. An air bag bearing slider as in claim 1, wherein the rail comprises a parallel section that is connected to the front pad.

10. An air bearing slider as in claim 4, wherein the first portion includes a first front rail and a first side rail, said first front rail has a leading edge that is skewed at an angle with respect to the leading edge and at a first direction to a first side of the longitudinal axis, and wherein the rail is generally diagonal in a second direction to a second side of the longitudinal axis.

11. An air bearing slider as in claim 10, wherein the rear pad comprises a generally rectangular shaped section near the trailing edge of the support structure, with a asymmetric section skewing towards the second side of the longitudinal axis at an angle, wherein the rail is connected to the asymmetric section.

12. An air bearing slider as in claim 2, wherein the front pad has a section that extends beyond the leading ABS pad towards the leading edge of the support structure.

13. An air bearing slider as in claim 2, wherein the leading ABS pad is generally U-shaped.

14. A suspension assembly for supporting a slider in relation to a recording medium in a magnetic disk drive, comprising: a suspension arm; an air bearing slider supported at a distal end of the suspension arm, said slider comprising: a support structure having a leading edge and a trailing edge relative to the motion of the recording medium, and a longitudinal axis along the length of the support structure; and an air bearing surface configured on the support structure to face the recording medium, said air bearing surface including: a front pad defined on the support structure near the leading edge, a leading ABS pad defined on the front pad, a rear pad defined on the support structure near the trailing edge, and a rail defined on the support structure interconnecting the front pad and the rear pad, wherein the rail is generally diagonal with respect to the longitudinal axis.

15. A magnetic disk drive, comprising: a magnetic recording medium with a data surface of concentric data tracks having a relatively smooth data zone and at least one textured zone; a motor drive for rotating the recording medium; an air bearing slider comprising: a support structure having a leading edge and a trailing edge relative to the motion of the recording medium, and a longitudinal axis along the length of the support structure; an air bearing surface configured on the support structure to face the recording medium, said air bearing surface including: a front pad defined on the support structure near the leading edge, a leading ABS pad defined on the front pad, a rear pad defined on the support structure near the trailing edge, and a rail defined on the support structure interconnecting the front pad and the rear pad, wherein the rail is generally diagonal with respect to the longitudinal axis; a transducer attached to the trailing edge of the slider; an actuator assembly coupled to the slider for pivotally positioning said slider relative to the recording medium to selected tracks on the data surface; and an electronic module for controlling the operations of the motor drive and actuator assembly and processing data read from and written to the data surface.

16. An air bearing slider for supporting a transducer over a rotating recording medium having a relatively smooth data zone and at least one textured zone, comprising: a support structure having a leading edge and a trailing edge relative to the motion of the recording medium, and a longitudinal axis along the length of the support structure; and an air bearing surface configured on the support structure to face the recording medium, said air bearing surface including: a front pad defined on the support structure near the leading edge, wherein the front pad comprises a leading ABS pad, wherein the leading ABS pad includes a first front rail and a second front rail separated by a channel across the leading edge of the support structure, wherein the first front rail has a first leading edge that is skewed at a first angle with respect to the leading edge of the support structure, and wherein the second front rail has a second leading edge that is skewed at the first angle with respect to the leading edge of the support structure, a rear pad defined on the support structure near the trailing edge, and a rail defined on the support structure interconnecting the front pad and the rear pad.

17. An air bearing slider for supporting a transducer over a rotating recording medium having a relatively smooth data zone and at least one textured zone, comprising: a support structure having a leading edge and a trailing edge relative to the motion of the recording medium, and a longitudinal axis along the length of the support structure; and an air bearing surface configured on the support structure to face the recording medium, said air bearing surface including: a front pad defined on the support structure near the leading edge, wherein the front pad comprises a leading ABS pad, which defines a cavity in the air bearing surface in which the rail is exposed, the leading ABS pad including a front rail, said front rail has a leading edge that is skewed at an angle with respect to the leading edge and at a first direction to a first side of the longitudinal axis, a rear pad defined on the support structure near the trailing edge, and a rail defined on the support structure interconnecting the front pad and the rear pad, wherein the rail is generally diagonal in a second direction to a second side of the longitudinal axis.

18. An air bearing slider as in claim 17, wherein the rear pad comprises a generally rectangular shaped section near the trailing edge of the support structure, with a asymmetric section skewing towards the second side of the longitudinal axis at an angle, wherein the rail is connected to the asymmetric section.

\* \* \* \* \*